(12) United States Patent
Landa et al.

(10) Patent No.: US 7,241,355 B1
(45) Date of Patent: Jul. 10, 2007

(54) LAMINATED IMAGE PRINTING METHOD

(75) Inventors: Benzion Landa, Nes-Ziona (IL); Ishaiau Lior, Rehovot (IL); Itzhak Ashkenazi, Kfar-Gibton (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 10/333,520

(22) PCT Filed: Sep. 3, 2000

(86) PCT No.: PCT/IL00/00522

§ 371 (c)(1),
(2), (4) Date: Jan. 21, 2003

(87) PCT Pub. No.: WO02/18151

PCT Pub. Date: Mar. 7, 2002

(51) Int. Cl.
*B32B 37/04* (2006.01)
*B32B 38/14* (2006.01)

(52) U.S. Cl. .................. 156/164; 156/201; 156/209; 156/219; 156/277

(58) Field of Classification Search .............. 156/209, 156/219
See application file for complete search history.

(56) References Cited

U.S. PATENT DOCUMENTS

| | | | | |
|---|---|---|---|---|
| 2,330,530 | A | * | 9/1943 | Tuttle .................... 156/495 |
| 2,675,852 | A | * | 4/1954 | Pasquale ................. 156/209 |
| 3,322,586 | A | * | 5/1967 | Hasenwinkle et al. ....... 156/201 |
| 3,417,497 | A | * | 12/1968 | Hannon ................. 283/108 |
| 3,716,439 | A | | 2/1973 | Maeda |
| 3,799,827 | A | * | 3/1974 | Takimoto et al. ........... 156/219 |
| 4,035,214 | A | | 7/1977 | Shuppert et al. |
| 4,077,830 | A | * | 3/1978 | Fulwiler ................. 156/249 |
| 4,517,042 | A | * | 5/1985 | Singer .................. 156/164 |
| 4,949,103 | A | | 8/1990 | Schmidlin et al. |
| 5,337,132 | A | * | 8/1994 | Cherian ................. 399/342 |
| 5,536,561 | A | * | 7/1996 | Turi et al. .............. 428/212 |
| 6,042,675 | A | | 3/2000 | Kim |
| 6,835,693 | B2 | * | 12/2004 | Bourdelais et al. ......... 503/227 |

FOREIGN PATENT DOCUMENTS

| | | |
|---|---|---|
| DE | 199 00 913 | 8/1999 |
| EP | 0 646 457 | 4/1995 |
| EP | 0 646 457 A1 | 5/1995 |
| GB | 2 053 089 | 2/1981 |
| JP | 4-316900 * | 9/1992 |
| WO | WO 95/06564 | 3/1995 |
| WO | WO 99/19773 | 4/1999 |
| WO | WO 01/22172 | 3/2001 |
| WO | WO 01/58695 | 8/2001 |

OTHER PUBLICATIONS

Ichiro,S.; Patent Abstracts of Japan; Jan. 31, 2000; vol. 2000, No. 01 & JP 11-282191; Oct. 15, 1999.
Masahiko,K.; Patent Abstracts of Japan; Jun. 14, 1988; vol. 012, No. 205 (P-716) & 63-006586; Jan. 12, 1988.
Nobuaki,H.; Patent Abstracts of Japan; Feb. 29, 1996; vol. 1996, No. 02 & JP 07-256755; Oct. 9, 1995.
Nobukatsu,A.; Patent Abstracts of Japan; Sep. 20, 1991; vol. 015, No. 374 (M-1160) & JP 03-150162; Jun. 26, 1991.
Norimasa,U. et al.; Patent Abstracts of Japan; Dec. 26, 1995; vol. 1995, No. 11 & JP 07-214742; Aug. 15, 1995.
Yasushi, T.; Patent Abstracts of Japan; Apr. 3, 1987; vol. 011, No. 105 (M-577) & JP 61-252190; Nov. 10, 1986.

* cited by examiner

*Primary Examiner*—Richard Crispino
*Assistant Examiner*—Barbara J. Musser

(57) ABSTRACT

A method of determining an adjusted color to be used for computing colorants for printing on a specified substrate, comprising: specifying an apparent color; estimating diffuse reflection from an outside surface of colorants when printed on the specified substrate; and adjusting the specified color for the effects of the estimated diffuse reflection to determine a color to be used for computing the colorants.

51 Claims, 4 Drawing Sheets

LAMINATED IMAGE PRINTING METHOD

RELATED APPLICATIONS

The present application is a U.S. national application of PCT Application No. PCT/IL00/00522, filed on Sep. 3, 2000.

FIELD OF THE INVENTION

The present invention is related to the field of printing and especially to the field of printing laminated images.

BACKGROUND OF THE INVENTION

U.S. Pat. No. 4,035,214 to Shuppert, et al. describes a printing system in which a release blanket is coated with a transparent film. A multi-color image is printed onto the release film and film, together with the images is transferred, image side down, onto a can. The release thus acts as a protective coating for the image. A film of adhesive is applied either to the image or to the can so that the film will transfer from the release blanket. The images are preferably printed by flexographic, letter press or other systems utilizing raised ink applicators.

U.S. Pat. No. 4,949,103 describes a direct electrostatic printing apparatus in which charged toner is applied by a print-head structure to a film coated with an adhesive to produce a "reverse reading image." The film with the image thereon are adhered to a final surface, with the image facing the final surface by the adhesive. The printed images may be alphanumeric text (for use in address labels) or a picture (for use in an identification badge).

It is well known in the art to print various types of images on paper or some other surface and then to laminate the printed image using either a single sheet of plastic material attached to the printed surface or by laminating a printed sheet between two sheets of plastic. In general, the plastic sheets are coated on one side with an adhesive material which adheres to the image. In some prior art systems the adhesive is not sticky at room temperature and the lamination process is carried out which subjecting the plastic sheet and the printed substrate to heat and pressure.

However, when thick plastic material is used, the image appears to be behind the front surface, which is not esthetically pleasing. On the other hand, when utilizing thinner plastic sheets, the structure or substructure of the printed sheet transfers to the front surface, reducing the quality of the resulting product.

These problems form a limitation on the use of such lamination in producing digital photographic prints (referred to herein as "digital photo-finishing"), i.e., the limitations on the surface finish available. In particular, laminated images, even when produced with very smooth plastic film, tend to have, on them, a pattern or other variations, unless they are thick. These variations on the surface may be due to the surface of the film following the surface texture of the paper to which it is bonded, or other causes.

WO 99/19733 and PCT applications PCT/IL00/0084, entitled "Printing on Plastic" and PCT/IL99/00510, entitled "Substrate Coating for Improved Toner Transfer and Adhesion", the disclosures of all of which are incorporated herein by reference, describe coating of plastic sheets with layer(s) which adhere to the sheets and to which liquid toners can be transferred and bonded. In general, these coatings comprise thermoplastic material.

It is known in the art to coat paper or other materials with thin layers of plastic. One method of coating, called casting, comprises extruding a thin layer of the plastic of the paper on the paper and then passing the coated paper through a pair of rollers, while the plastic is still hot. The plastic replicates the finish of the roller that touches it. One use for such coated paper is as a substrate for various printing processes.

SUMMARY OF THE INVENTION

An aspect of some embodiments of the invention is concerned with the provision of a controllable finish on laminated digital photo-finished images.

In accordance with an exemplary embodiment of the invention, after lamination of the images, the outer surface of the plastic laminate is kept in contact with a hot lamination roller for a longer time than necessary to perform the lamination, the time being long enough so that the surface of a lamination roller used in the process is replicated or near replicated on the surface. Even if the plastic laminate is quite thin the plastic surface will replicate the surface of the roller, and it will not be substantially affected by the surface finish of the underlying paper substrate.

Alternatively or additionally, the outer surface is brought into contact with the hot lamination roller, preferably under pressure for at least a portion of the time of contact, prior to lamination. While the process is not fully understood, the preheating of the laminate aids the replication process and, to a significant extent, the replication process takes place even without keeping the laminate in contact with the lamination roller after the lamination has been performed.

In an alternative embodiment of the invention, hot plastic material is extruded onto a printed image. The still hot coated image is passed through a pair of rollers. The rollers control the thickness of the coating and the surface of the plastic replicates the surface of the roller with which it is in contact.

An aspect of some embodiments of the invention is concerned with the printing of images on a thermoplastic layer (such as a hot melt adhesive) coated on a clear film. Since the substrate is not tacky (or at least not very tacky) during the printing process, a wide range of such processes may be used, including liquid or powder toner electrophotographic layers.

In some embodiments of the invention, the film is a sheet of clear plastic.

In some embodiments of the invention, after printing, the substrate and the image are adhered to a substrate with the image face down on the substrate, by applying heat and pressure to the substrate/film interface. In some embodiments of the invention, the toner particles are based on a thermoplastic resin, such that when the film/image is bonded to the substrate, the image also adheres to the substrate. This avoids adhesion problems that might occur when large areas are printed with non-thermoplastic based toners.

An aspect of some embodiments of the invention is concerned with the printing of images for lamination utilizing inks, such as toner materials, that are (at least in part) thermoplastic on a plastic cover sheet and the subsequent lamination of the thus printed images, utilizing heat and pressure, to a final substrate, utilizing heat and pressure.

In exemplary embodiments of the invention, the images are formed utilizing an electrostatic process, such as electrophotography, optionally utilizing an intermediate transfer member to transfer the image from a photoreceptor to the cover sheet.

An aspect of some preferred embodiments of the invention is concerned with the reverse printing of images for lamination on a clear plastic cover sheet, with an electrophotographic processes utilizing charged toner. The toner, in some embodiments of the invention is a liquid toner. In alternative embodiments, the toner may be powder toner. In exemplary embodiments of the invention, the images are multi-color images and all of the colors are transferred to the cover sheet together.

An aspect of some embodiments of the present invention is concerned with the lamination of thermoplastic coated sheets of plastic onto paper or other thin substrates.

In general, such lamination is performed by pressing the sheet and substrate together under pressure. When the lamination cools, the cover sheet generally shrinks to a greater degree than the substrate, especially if the substrate is made of paper. This causes curling of the laminated surface. While this can be avoided by using either a thick cover sheet or substrate or by laminating the substrate on both sides, these solutions result in high cost and/or bulky laminates.

In accordance with exemplary embodiments of the invention, the substrate is "pre-curled" in a direction opposite the direction that curling of the cover sheet would cause. When the amount of pre-curl is matched to the curling forces induced by the shrinkage, a laminate with reduced or no curl may be produced.

In some embodiments of the invention, two or more of the above aspects are combined. There is thus provided, in accordance with an exemplary embodiment of the invention, a method for providing a laminated image having a desired surface, the method comprising:

bringing a clear cover sheet in contact with a substrate;
pressing it against the substrate utilizing a roller, having a surface finish, to laminate an image between the cover sheet and the substrate, the lamination being by heat and pressure, and including:
heating the surface of the cover sheet that is in contact with the roller to a temperature and for a time such that the surface of the cover sheet replicates the surface finish of the roller.

Optionally, the surface of the cover sheet is preheated, prior to contact with the substrate.

In an exemplary embodiment of the invention, the roller is a heated roller and the sheet is preheated by contact with the roller. Alternatively or additionally, the cover sheet is preheated by an external heater during to its contact with the roller.

In an exemplary embodiment of the invention, the cover sheet is kept in contact with the roller after the lamination for a time period such that the surface of the cover sheet replicates the surface finish of the roller. This period is, for example, between 0.05-0.3 sec, more usually, 0.1 to 0.2 sec. Longer or shorter periods may be used, depending on the roller temperature.

Optionally, the image is formed on the cover sheet before it is brought into contact with the substrate. Alternatively, the image is formed on the substrate before it is brought into contact with the cover sheet.

The finish may be a glossy finish, a matte finish. The finish may incorporate a hologram or a security marking.

In some embodiments of the invention the method includes providing an adhesive to adhere the clear sheet to the substrate. Optionally the adhesive is provided on the printed image. Optionally, the adhesive is provided on top of the printed image. Alternatively or additionally the adhesive is provided on the cover sheet.

There is further provided, in accordance with an exemplary embodiment of the invention, a method of producing a laminated image, comprising:

providing a clear cover sheet coated on at least one side with an adhesive layer;
printing an image on the adhesive layer;
pressing the image side of the sheet against a final substrate while heating at least the layer to a temperature sufficient to adhere the sheet to substrate.

Optionally, pressing comprises:
contacting the sheet and the substrate;
passing the thus contacted layer and sheet through a nip formed by the surface of a roller and a second surface.

Optionally, the second surface is the surface of a second roller.

The method optionally includes heating at least one of the roller and the second surface optionally, both the roller and the second surface.

In an embodiment of the invention the method includes, pre-bending the substrate away from the nip prior to the substrate entering the nip.

In an exemplary embodiment of the invention, the adhesive is a thermoplastic layer, such as a hot melt adhesive. Optionally, the adhesive layer comprises ethylene vinyl acetate, amine terminated polyamide, polyethylene imine, a cross-linked polyacrylic ester, an ionomer, a copolymer of ethylene and methacrylic acid.

The adhesive layer is optionally less than 50 micrometers thick, less than 40 microns thick or less than 30 microns thick. Optionally, the adhesive layer is more than 5 micrometers thick.

In exemplary embodiments, the cover sheet is a plastic material. Optionally, the material of the cover sheet comprises textured polycarbonate, polyester, PVC, polypropylene, amine terminated polyamide, polyethylene.

In exemplary embodiments, the cover sheet is less than about 70 micrometers thick. Optionally it is less than about 50, 40, 30 or 20 micrometers thick.

In exemplary embodiments of the invention, the overall thickness of the laminate between the image surface of the substrate and the outer surface of the laminate is less than 100 micrometers. Optionally it is less than 80, 70, 60, 50, 40, 30 or 20 micrometers.

In exemplary embodiments of the invention, the image comprises thermoplastic material. Optionally, pressing comprises heating the image to a temperature, at which it adheres to the final substrate.

There if further provided, in accordance with a preferred embodiment of the invention, a method of hot laminating a plastic cover sheet and a paper substrate, comprising:
pre-bending the substrate; and
pressing the sheet and convex surface of the substrate together, while heating at least the sheet.

Optionally, pressing comprises:
contacting the convex surface of the cover sheet and the substrate;
passing the thus contacted substrate and cover sheet through a nip formed by the surface of a roller and a second surface.

Optionally, the second surface is the surface of a second roller.

Optionally, the method includes heating at least one of the roller and the second surface, optionally both the roller and the second surface.

Optionally, pre-bending comprises:
wrapping the substrate around a portion of the roller, prior to its entering the nip.

There is further provided, in accordance with an exemplary embodiment of the invention a method of producing a laminated image, comprising:

printing an image on a substrate;

coating the image with a hot polymer layer; and passing the coated substrate through a pair of rollers while the polymer is still sufficiently hot so that the surface of a roller is replicated on the surface.

Optionally, the image comprises a polymer and the polymer layer and the coating are the same.

Typically, the distance between the rollers is less than the 100 microns greater than the thickness of the substrate. Optionally, the distance between the rollers is less than 70, 50, 30 or 20 microns greater than the thickness of the substrate.

Optionally, the coating comprises polyethylene or amine terminated polyamide.

Optionally, the image is a liquid toner image, a powder toner image comprises printing ink or is formed by an ink-jet process.

Typically the substrate is paper, optionally, glossy paper.

In an embodiment of the invention, the image is a digital image, optionally, a digital photographic image.

Exemplary embodiments of the invention are described in the following description of non-limiting exemplary embodiments thereof, read in with reference to the figure attached hereto. Dimensions of components and features shown in the figures are chosen primarily for convenience and clarity of presentation and are not necessarily to scale.

DETAILED DESCRIPTION OF EXEMPLARY EMBODIMENTS OF THE INVENTION

Figure 1:
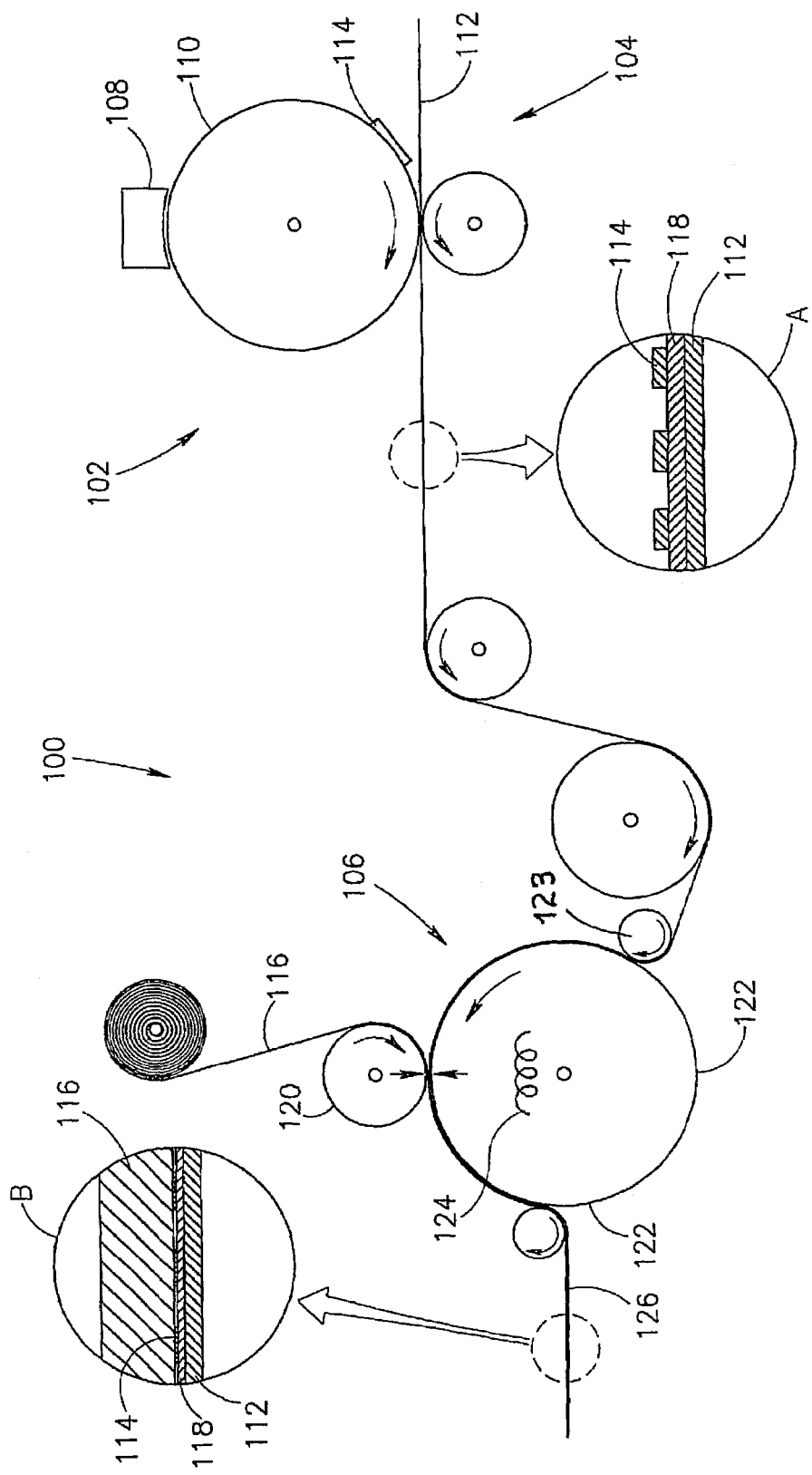
FIG. 1 schematically shows apparatus for producing laminated images, in accordance with an embodiment of the invention.

FIG. 1 schematically shows apparatus 100 for producing laminated images, in accordance with an embodiment of the invention.

In the exemplary embodiment shown the apparatus comprises three parts, namely image forming apparatus 102, printing apparatus 104 and a lamination station 106.

Image forming apparatus 102 is shown very schematically as a block 108 and an intermediate transfer member 110. This schematic representation is meant to indicate that for some embodiments of the invention, the exact structure or even the type of image forming apparatus used is not critical. For exemplary embodiments of the invention, the image forming process is an electrostatic process, for example a process that utilizes a thermoplastic toner. In some embodiments the toner is a liquid toner, in others it is a powder toner. In still others the images may be formed using other digital or conventional printing processes. In accordance with some aspects of the invention, the image thus formed comprises a thermoplastic material.

In an exemplary embodiment of the invention, image forming apparatus 102 may be an Omnius® printer (Indigo, N.V.) utilizing ElectroInk® Mark 3.1 ink. This ink is a liquid toner comprising charged toner particles based on a copolymer of ethylene and methacrylic acid. Other toners and inks based on materials such as other polymers as known in the art can also be used. Virtually any powder toner may be used. Conventional printing inks or ink-jet inks may also be used in some embodiments of the invention. It should be understood that for some aspects of the invention, the images are thermoplastic and are tacky at the lamination temperature. For others these characteristics are not required.

In the embodiment shown in FIG. 1, the images are first transferred to intermediate transfer member 110. In some embodiments of the invention, color separations are first assembled on member 110 before being transferred from the member. In others, the color separations are transferred one at a time to a substrate 112. In yet other embodiments of the invention, the intermediate transfer member may be omitted and the images transferred directly from printing station 104 to a cover sheet 112. In some embodiments of the invention, printing station 104 may include a photoreceptor on which a latent image is formed, which image is developed by a liquid or powder toner. In some embodiments other image forming methods such as ink-jet or conventional ink printing are used.

As indicated above, in some embodiments of the invention, the image, after transfer to substrate 112 is, at least in part, comprised of a thermoplastic material.

At printing station 104 an image 114, shown with exaggerated thickness in insert A, for clarity, is transferred to cover sheet 112. To emphasize that the image may be a half-tone image, it is shown as being made up of discontinuous portions. The transfer is generally by a method that is suitable for use with the type of image. Thus, the transfer may be electrostatically aided and/or may use heat and/or pressure to aid the transfer. If heat and pressure are used in the transfer, the image may be fixed by the heat and pressure to the cover sheet during the transfer. If such fixing is not (at least partially) achieved in the transfer process, it may be desirable to at least partially fix the image to the cover sheet, to avoid damage to the image during transport and the lamination process.

In some embodiments of the invention, cover sheet 112 is coated with a thermoplastic layer 118 that becomes adhesive at temperatures used in the lamination process. Such coatings should bond well with the cover sheet and should provide good adhesion to a final substrate 116 during the lamination process. The structure of the cover sheet/coating layer/image is shown in more detail in insert "A." It should also, ideally, have a good adhesion to the image. Exemplary materials useful for layer 118 are ethylene vinyl acetate, amine terminated polyamide, polyethylene imine, acrylic material such as a cross-linked polyacrylic ester, an ionomer, or a copolymer of ethylene and methacrylic acid. Other hot melt adhesives can be used. In some embodiments of the invention an adhesive overlayer may coated onto the image instead of or in addition to the adhesive underlayer.

The choice of a toner or ink material and a thermoplastic layer material depends to a great extent on the ability of the printing process chosen to print the ink onto the layer reliably. Optionally, the tackifying temperatures of the image and layer should be reasonably close to each other, although this is not absolutely necessary.

If heat and pressure are used to transfer the image to the substrate, transfer may be improved if the tackifying temperature of image 114 is lower than that of coating 118, such that the transfer can be made at a temperature intermediate the two tackifying temperatures.

In FIG. 1, for ease of description, the process as shown as a continuous web-fed process. However, the cover sheet may be sheet fed, rather than web feed and sheet fed printers such as the E-Print 1000®, Turbostream®, or Ultrastream® printers (Indigo) may be used.

After image 114 is printed onto cover sheet 112, the cover sheet is laminated to final substrate 116 at lamination station 106. An exemplary lamination station 106, as shown in FIG. 1, comprises a web of substrate 116 that is fed, together with printed cover sheet 112 through a nip 121 formed by a pair of rollers 120 and 122. At least one of the rollers, and more preferably roller 122 (which contacts the cover sheet) should be heated, for example by an internal heater 124. Alternatively or additionally, roller 120 is also heated, by a heater (not shown).

In some embodiments of the invention, cover sheet 112 is preheated prior to lamination. Such preheating may allow for a faster throughput and lower roller temperatures. In addition, it may result in a higher gloss or other replication of the surface finish of roller 122, in the finished product.

An exemplary method of preheating cover sheet 112 is to wrap it around roller 122 prior to its reaching nip 121. This allows for more time for sheet 112 to reach the laminating temperature and thus, the speed of the entire process may be increased. In some embodiments of the invention, a roller 123 presses the plastic sheet against roller 122 to initiate a process of replication of the surface of the roller on the surface of the plastic. Roller 123 may be cooled and/or coated with a non-stick coating to avoid sticking of the toner/adhesive to it.

Other methods of preheating the cover sheet (hot air, radiant heat, etc.) as known in the art may also be used. Alternatively or additionally, final substrate 116 may be preheated by one or more of the means described for heating cover sheet 112.

The preheating of sheet 112 to a sufficiently high temperature and keeping it in contact with the surface of roller 122 softens the surface of sheet 112 in contact with roller 122 to an extent that it replicates the surface of the roller either during and/or before the lamination process.

At nip 121, substrate 116 is laminated with cover sheet 112, with image 104 facing the substrate to form a laminated image carrying sheet 126. Sheet 126 may be cut into individual pictures as desired. Sheet 126 is shown in greater detail in insert "B."

It is noted that the thicknesses of layer 118 and image 114 are exaggerated as compared with the thickness of cover sheet 112. In some embodiments of the invention, cover sheet 112 is formed of a base of PET, textured polycarbonate, PVC, polyethylene, polypropylene, amine terminated polyamide or other clear plastic material having a thickness of, for example 10 to 30 micrometers (although thicker and somewhat thinner material may be used). If replication of the roller surface is desired, some of these materials are not recommended, with polyethylene, polypropylene, PVC and amine terminated polyamide working best for replication. The coating may have a sub-micron thickness and will seldom be greater than 2 microns. The image, depending on the technology used to print it, may be less than 5 micrometers thick (for liquid toner images) or as much as 30 microns thick for powder toner images. Conventional printing images are of the same order of thickness as the liquid toner images. For producing of high quality images, such as for "digital photography," substrate 112 may be a glossy paper, having the look and feel of photographic paper. The laminated image will then look substantially similar to a conventional glossy photograph.

Alternatively or additionally, cover sheet 112 may be kept in contact with roller 122 after the lamination. This is shown in FIG. 1. If not implemented, the sheet may end its contact with rollers 120 and 122 at the nip between them.

The temperatures and pressures used in the laminating process and the speed will depend on the coating material, the toner material, the lamination time and whether the cover sheet/substrate are preheated. Ideally, the pressure, temperature and time should be sufficient to cause both the coating and the image to reach a temperature at which they become tacky and adhere to the substrate.

A feature of some aspects of the invention is the interplay between the stresses induced by the laminating process on laminated sheet 126. During the laminating process, both sheet 112 and substrate 116 are heated. However, the temperatures reached by the two and/or the expansion they exhibit under temperature and pressure may be different. In general, the cover sheet is both hotter and expands more than the substrate. Thus, if both the sheet and the substrate entered the lamination station at a small angle, the subsequent shrinkage of the cover sheet would causes the resultant laminate to curl. This curling can be reduced or eliminated by pre-bending the substrate as shown in the Fig., such that when the lamination is completed the stresses induced by the substrate and the cover sheet in opposite directions is the same. It may also be useful to bend the laminate after the lamination by keeping it is contact with roller 120, to further counteract the effect of the shrinkage of the cover sheet.

It should be understood that FIG. 1 shows a number of aspects of the invention and several methods for implementing them. However, in some embodiments of the invention only one or two aspects may be present and only one or two of the methods of implementing the aspect may be used. This is especially evident in the embodiment shown in FIG. 2. In addition it should be understood that some of the implementation methods that are not shown may be used in addition to, or instead of, the implementation methods shown.

Figure 2:
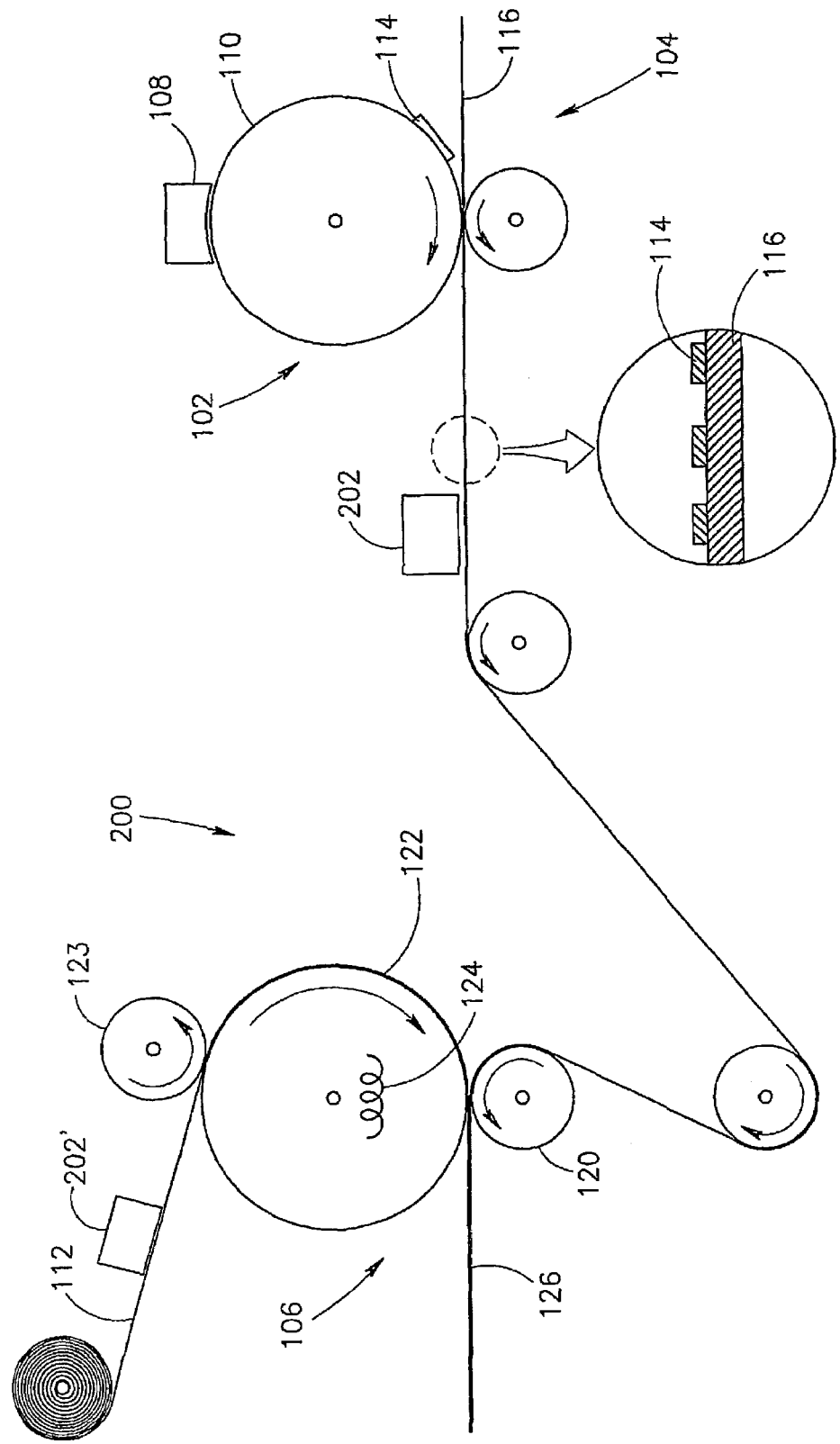
FIG. 2 schematically shows apparatus for producing laminated images, in accordance with an alternative embodiment of the invention.

FIG. 2 shows an alternative embodiment of the invention 200, in which the image is printed on the paper and lamination is performed by laminating a clear plastic film, such as a film of PVC, polyethylene, polypropylene or amine terminated polyamide, onto the printed sheet. This "conventional" process is made unconventional by the provision of the replication of the roller surface finish as described above, to the resulting laminated image. Such finish may include a matte finish, a very high gloss finish, a security finish or a holograph. Very high gloss or matte finishes are especially desired in digital photo-finishing operations.

As shown in FIG. 2, an image is printed onto a substrate 116, such as a paper substrate. Preferably, the paper should have a high gloss surface. However, ordinary paper can be used, since the main surface finish effect comes from the surface of the cover sheet.

The paper may be pretreated as described above with respect to cover sheet 112. Alternatively, no adhesive layer (other than the toner itself) is provided. Alternatively or additionally, a coating station 202 (of any type known in the art) is provided to coated with a material that is adhesive, at least under the heating provided in the lamination process, to at least the paper and the plastic overlay sheet and preferably to the toner image. Alternately or additionally, as indicated in FIG. 2 and as described below, adhesive can be provided on cover sheet 112.

After the optional coating (which coating should be dry if substrate 116 is to be pre-bent), the substrate may optionally be pre-bent, by wrapping it around roller 120, as described with respect to FIG. 1 and as shown in FIG. 2.

At lamination station 106, printed substrate 116 is joined with cover sheet 112, which is preheated in the manner described above, if surface replication is desired. Additionally or alternatively to the placement of adhesive on the printed image by coating station 202, the cover sheet 112 is either precoated or coated by a coating station 202' with adhesive material that bonds to the image and substrate 116 and/or to any adhesive present on the substrate.

In exemplary embodiments of the invention, where replication is desired, rollers 120 and 122 are hard rollers, which may be made of hardened chrome coated mirror polished steel. If a matte or other finish is desired, the surface of roller 122 should be formed with the finish to be replicated. The rollers may be of any suitable size, with a roller size of between 40 and 200 mm believed to be usable. An experimental system utilized 80 mm diameter rollers for both rollers 120 and 124. It should be understood that these rollers may be the same or different sizes. 160 mm rollers have also given similar results. Process speed may vary between 200 and 3000 mm/sec (600-1200 being preferred) and the nip may be between 1 and 6 mm in length (2 mm being preferred), although other speeds and nip sizes are possible. The size of the nip will depend, inter alia on the pressure applied, and the thickness and type of materials (paper and plastic) used in the laminate. The temperature used, depends on the materials. For a polypropylene sheet and EVA adhesive, 85-120 degrees Celsius has been found to be suitable. A pressure of about 50 kg/cm of roller length may be used for achieving a 2 mm nip, however, different pressures will be used for different nip sizes. Alternatively, fixed spacing for the rollers may be used, if the material thickness is accurately known and stable.

In an exemplary embodiment the plastic sheet and the adhesive are both 30 micrometers thick, although much thicker or thinner layers may be used, such as thicknesses between 10 and 50 micrometers. Thicker materials may be used, however, the image will appear to be substantially behind the surface. The paper is typically 200 micrometers thick.

The dwell time on the heated roller may vary, depending on the preheating, the roller temperature and the laminate material. Typical dwell times are between 0.05 and 0.3 sec, although longer times are also useful. Times between 0.1 and 0.2 are exemplary.

Figure 3:
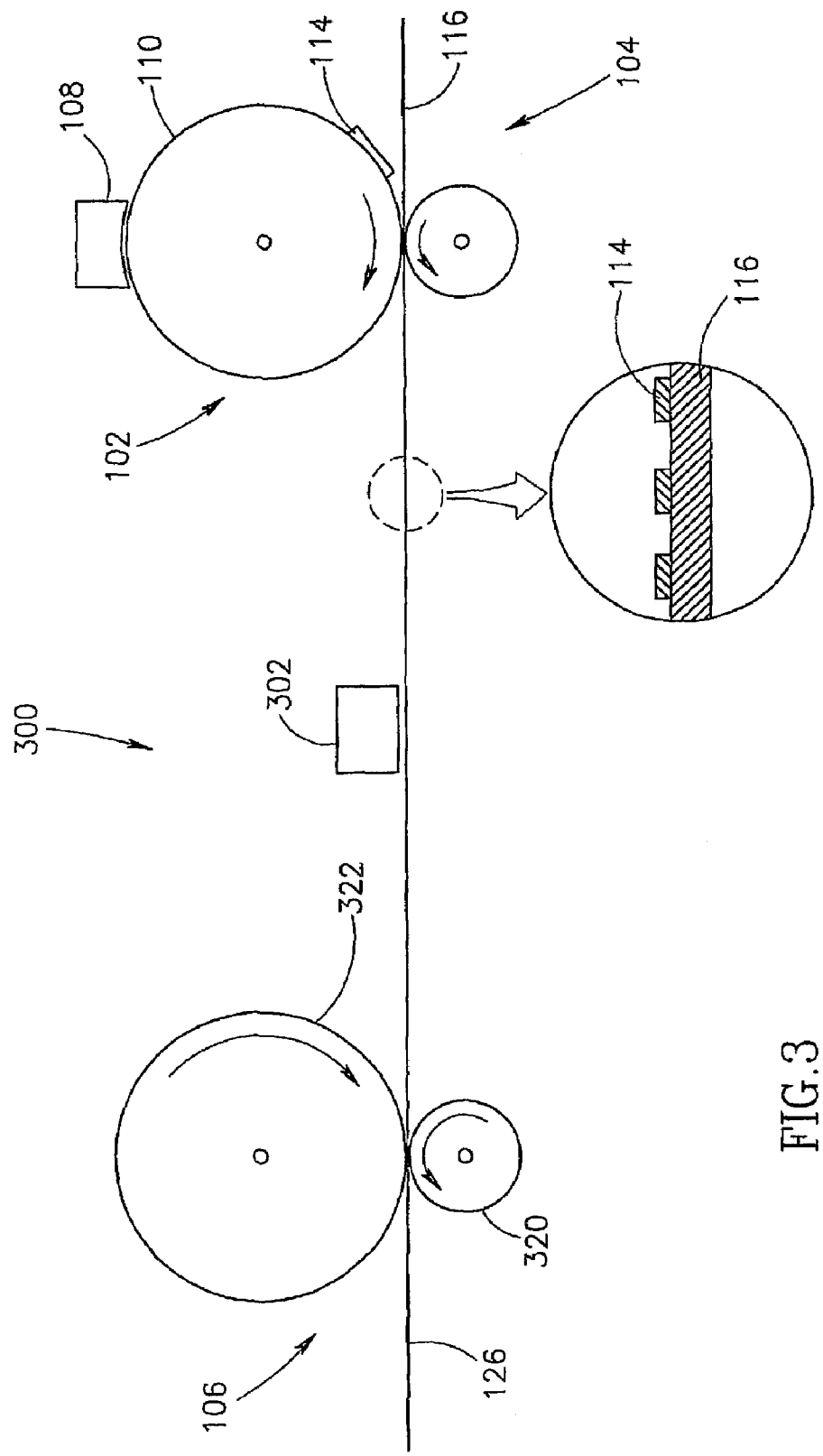
FIG. 3 schematically shows apparatus for producing laminated images, in accordance with an alternative embodiment of the invention.

FIG. 3 shows an alternate apparatus 300 for applying an image to a digital photographic image. In the apparatus of FIG. 3, a layer of 0.5 g/m² amine terminated polyamide, polyethylene, or other suitable material is applied to a paper substrate 116 printed with an image 114. In an exemplary embodiment of the invention, the material is extruded onto the image by an extruder 302. While still hot, the coated paper is passed through a nip of rollers 322 and 320. In contrast to the rollers of FIGS. 1 and 2, roller 322 is preferably cold (or even cooled) so that the coating cools during its passage through the nip. The surface texture of roller 322 is then replicated on the coating. Any casting process can be used for the embodiment of FIG. 3, such processes being well known. The final overcoat can be quite thin, with the rollers spaced only a slightly greater distance apart (e.g., 10, 20, 30, 40, 50, 70 or 100 microns) than the thickness of the substrate. Alternatively, the rollers can be further apart. Other suitable materials and various thickness of coating can also be used.

Figure 4:
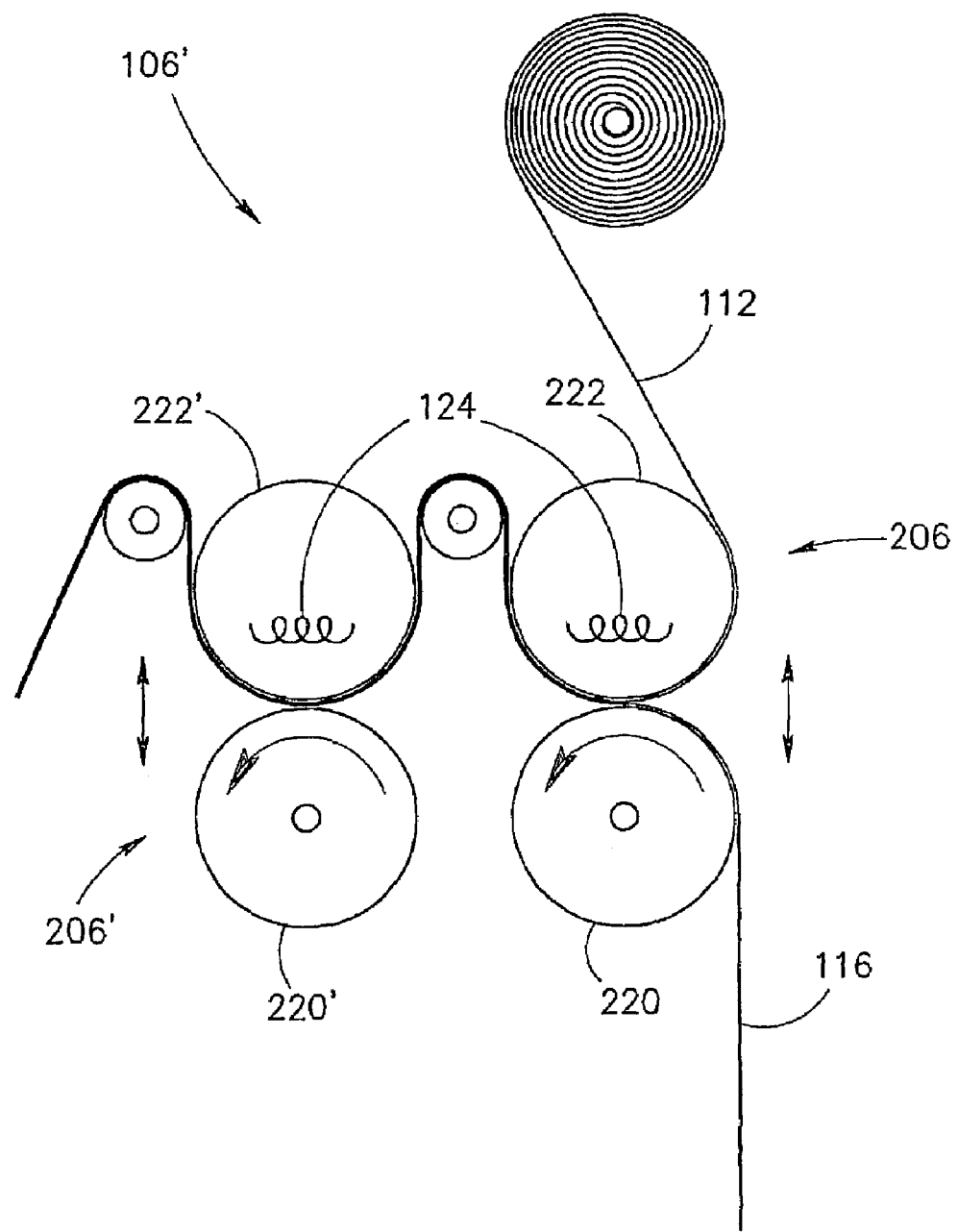
FIG. 4 schematically shows a laminator in which different surface finishes can be selectively reproduced on a laminated image, in accordance with a preferred embodiment of the invention.

FIG. 4 shows an alternative, dual mode lamination station 106' which can replace the lamination station of FIG. 2 or, with a reversal of rollers 220 and 222, can replace the lamination station of FIG. 1.

Station 106' comprises a first station 206 and a second station 206'. Each station comprises a hot roller (222, 222') and a backing roller (220, 220'), which may be heated or unheated. In operation the surface finishes of rollers 222 and 222' are different, with one of the finishes (for example that of roller 222) being smooth, as described above, and the other having a matte finish. When glossy images are desired, the heater in roller 222' is preferably shut off and the rollers 220' and 222' are separated. The lamination and surface replication operate in the same manner as described above with respect to FIG. 2. If a matte finish is desired, rollers 220 and 222 are preferably disengaged and the heating of roller 222 preferably interrupted and the rollers 220' and 222' engaged to laminate and replicate the surface of roller 222. It is believed that the disengagement of rollers 222 and 220 and the interruption of the heating may not be essential, since the second set of rollers will act to replicate the finish of roller 222', in any event. It also may not be necessary to both interrupt the heating and separate rollers 220' and 222' when the fist set of rollers is in use.

The system can be extended to a larger number of sets of rollers, for embossing patterns, numbers, holograms or a security finish on the surface.

It should be understood that many of the above embodiments have been described with respect to a very smooth, polished roller 122, which provides a glossy finish to the final laminated image. However, the roller may impart a matte finish to the surface or even apply a holograph to the surface.

As a further variation of the invention, the rear side of the laminated sheet is coated with a plastic coating. This coating keeps humid air from the paper. Absorption of moisture by the paper can result in curling of the laminate.

The invention has been described in terms of an exemplary embodiment that includes combinations of various aspects of the invention. However, some embodiments of the invention may include fewer aspects of the invention. Furthermore, some details shown in the embodiments, while preferred, are not essential and some preferred embodiments of the invention may omit them.

As used herein, the terms "have", "include" and "comprise" or their conjugates, as used herein mean "including but not limited to".

The invention claimed is:

1. A method for providing a laminated image having a desired surface, the method comprising:

bringing a clear cover sheet in contact with a substrate;

pressing the clear cover sheet against the substrate utilizing a roller, having a surface finish, to laminate an image between the cover sheet and the substrate, the lamination being by heat and pressure;

pre-bending the substrate to a degree such that, upon completion of the lamination and cooling, curling of the laminated image is counteracted by substantial equalization of opposed forces of the substrate and the cover sheet; and heating the surface of the cover sheet that is in contact with the roller to a temperature and for a time such that the surface of the cover sheet replicates the surface finish of the roller.

2. A method according to claim 1 wherein the surface of the cover sheet is preheated, prior to contact with the substrate.

3. A method according to claim 1 wherein the roller is a heated roller and the sheet is preheated by contact with the roller.

4. A method according to claim 3 wherein the cover sheet is preheated by an external heater during to its contact with the roller.

5. A method according to claim 1 wherein the cover sheet is kept in contact with the roller after the lamination for a time period such that the surface of the cover sheet replicates the surface finish of the roller.

6. A method according to claim 5 wherein the cover sheet is kept in contact with the roller for a period of at least 0.05 seconds.

7. A method according to claim 6 wherein the cover sheet is kept in contact with the roller for a period of less than 0.3 seconds.

8. A method according to claim 5 wherein the cover sheet is kept in contact with the roller for a period of between 0.1 and 0.2 seconds.

9. A method according to claim 1, wherein the image is formed on the cover sheet before it is brought into contact with the substrate.

10. A method for providing a laminated image having a desired surface, the method comprising:

bringing a clear cover sheet in contact with a substrate;

pressing the clear cover substrate against the substrate utilizing a roller, having a surface finish, to laminate an image between the cover sheet and the substrate, the lamination being by heat and pressure pre-bending the substrate to a degree such that, upon completion of the lamination and cooling, curling of the laminated image is counteracted by substantial equalization of opposed forces of the substrate and the cover sheet; and heating the surface of the cover sheet that is in contact with the roller to a temperature and for a time such that the surface of the cover sheet replicates the surface finish of the roller, wherein the image is formed on the substrate before it is brought into contact with the cover sheet.

11. A method according to claim 1 wherein the surface finish is a glossy finish.

12. A method according to claim 1 wherein the surface finish is a matte finish.

13. A method according to claim 1 wherein the surface finish comprises a hologram.

14. A method according to claim 1 wherein the surface finish comprises a security marking.

15. A method according to claim 1 and including providing an adhesive to adhere the clear sheet to the substrate.

16. A method according to claim 15 wherein the adhesive is provided on the image.

17. A method according to claim 15 wherein the adhesive is provided on top of the image.

18. A method according to claim 15 wherein the adhesive is provided on the cover sheet.

19. A method according to claim 15 wherein the adhesive is a thermoplastic layer.

20. A method according to claim 15 wherein the adhesive is a hot melt adhesive.

21. A method according to claim 20 wherein the adhesive layer is less than 50 micrometers thick.

22. A method according to claim 21 wherein the adhesive layer is less than 30 microns thick.

23. A method according to claim 20 wherein the adhesive layer is more than 5 micrometers thick.

24. A method according to claim 15 wherein the adhesive layer comprises ethylene vinyl acetate.

25. A method according to claim 15 wherein the adhesive layer comprises amine terminated polyamide.

26. A method according to claim 15 wherein the adhesive layer comprises polyethylene imine.

27. A method according to claim 15 wherein the adhesive layer comprises a cross-linked polyacrylic ester.

28. A method according to claim 15 wherein the adhesive layer comprises an ionomer.

29. A method according to claim 15 wherein the adhesive layer comprises a copolymer of ethylene and methacrylic acid.

30. A method according to claim 1 wherein the cover sheet is a plastic material.

31. A method according to claim 1 wherein the cover sheet is less than about 70 micrometers thick.

32. A method according to claim 1 wherein the cover sheet is less than 40 microns thick.

33. A method according to claim 1 wherein the cover sheet is less than 20 microns thick.

34. A method according to claim 1 wherein the overall thickness of the laminate between the image surface of the substrate and the outer surface of the laminate is less than 100 micrometers.

35. A method according to claim 34 wherein the overall thickness of the laminate between the image surface of the substrate and the outer surface of the laminate is less than 70 micrometers.

36. A method according to claim 34 wherein the overall thickness of the laminate between the image surface of the substrate and the outer surface of the laminate is less than 30 micrometers.

37. A method according to claim 1 wherein the image comprises a thermoplastic material.

38. A method according to claim 37 wherein pressing comprises heating the image to a temperature, at which it adheres to the final substrate.

39. A method according to claim 1, wherein the image is a liquid toner image.

40. A method according to claim 1 wherein the image is a powder toner image.

41. A method according to claim 1 wherein the image comprises printing ink.

42. A method according to claim 1 wherein the image is formed by an ink-jet process.

43. A method according to claim 1 wherein the substrate is kept in contact with a roller, after the lamination, as required to further counteract effects of shrinkage of the coversheet, and to thereby reduce curl of the laminated image.

44. A method according to claim 43 wherein the substrate is glossy paper.

45. A method according to claim 1 wherein the image is a digital image.

46. A method according to claim 1 wherein the image comprises a digital photographic image.

47. A method for providing a laminated image having a desired surface, the method comprising:

bringing a clear cover sheet in contact with a glossy paper substrate;

pressing the clear cover substrate against the substrate utilizing a roller, having a surface finish, to laminate an image between the cover sheet and the substrate, the lamination being by heat and pressure;

pre-bending the glossy paper substrate to a degree such that upon completion of lamination and cooling, curling of the laminated image is counteracted by substantial equalization of opposed forces generated by the glossy paper substrate and the clear cover sheet;

heating the surface of the cover sheet that is in contact with the roller to a temperature and for a time such that the surface of the cover sheet replicates the surface finish of the roller; and post-bending the laminated image by keeping it in contact with a roller, after the lamination, as required to further counteract effects of shrinkage of the coversheet upon cooling, and to thereby reduce curl of the laminated image.

48. A method according to claim 47 wherein the image is a digital image.

49. A method according to claim 47 wherein the image comprises a digital photographic image.

50. A method for providing a laminated image having a desired surface, the method comprising:

bringing a clear cover sheet in contact with a substrate;

pressing the clear cover substrate against the substrate utilizing a roller, having a surface finish, to laminate an image between the cover sheet and the substrate, the lamination being by heat and pressure;

pre-bending the substrate to a degree such that upon completion of lamination and cooling, curling of the laminated image is counteracted by substantial equalization of opposed forces generated by the glossy paper substrate and the clear cover sheet; and heating the surface of the cover sheet that is in contact with the roller to a temperature and for a time such that the surface of the cover sheet replicates the surface finish of the roller, wherein the roller is a heated roller and the sheet is preheated by contact with the roller.

51. A method according to claim 50 wherein the cover sheet is preheated by an external heater during to its contact with the roller.

* * * * *